United States Patent
Detlefs et al.

(10) Patent No.: US 8,769,514 B2
(45) Date of Patent: Jul. 1, 2014

(54) DETECTING RACE CONDITIONS WITH A SOFTWARE TRANSACTIONAL MEMORY SYSTEM

(75) Inventors: David L. Detlefs, Issaquah, WA (US); Michael M. Magruder, Carnation, WA (US); Yosseff Levanoni, Redmond, WA (US)

(73) Assignee: Microsoft Corporation, Redmond, CA (US)

( * ) Notice: Subject to any disclaimer, the term of this patent is extended or adjusted under 35 U.S.C. 154(b) by 1324 days.

(21) Appl. No.: 12/163,902

(22) Filed: Jun. 27, 2008

(65) Prior Publication Data

US 2009/0328019 A1     Dec. 31, 2009

(51) Int. Cl.
*G06F 9/45*         (2006.01)

(52) U.S. Cl.
CPC .................................... *G06F 8/443* (2013.01)
USPC ............................. 717/154; 717/140; 717/151

(58) Field of Classification Search
CPC ........................................................ G06F 8/443
USPC .................................................. 717/140–161
See application file for complete search history.

(56) References Cited

U.S. PATENT DOCUMENTS

| | | | |
|---|---|---|---|
| 5,872,978 A * | 2/1999 | Hoskins | 717/158 |
| 6,343,371 B1 | 1/2002 | Flanagan et al. | |
| 6,817,009 B2 | 11/2004 | Flanagan et al. | |
| 7,028,119 B2 | 4/2006 | Hue | |
| 7,076,776 B2 | 7/2006 | Kim et al. | |
| 7,231,498 B2 | 6/2007 | Rodeheffer et al. | |
| 7,395,382 B1 * | 7/2008 | Moir | 711/147 |
| 7,555,619 B2 * | 6/2009 | Harris | 711/162 |
| 7,590,806 B2 * | 9/2009 | Harris et al. | 711/154 |
| 7,620,850 B2 * | 11/2009 | Lev et al. | 714/35 |
| 7,810,085 B2 * | 10/2010 | Shinnar et al. | 717/156 |
| 7,861,237 B2 * | 12/2010 | Tarditi et al. | 717/151 |
| 7,870,545 B2 * | 1/2011 | Saha et al. | 717/159 |
| 7,895,582 B2 * | 2/2011 | Duffy et al. | 717/140 |
| 7,966,459 B2 * | 6/2011 | Nussbaum et al. | 711/154 |
| 8,099,726 B2 * | 1/2012 | Harris | 717/159 |
| 8,117,605 B2 * | 2/2012 | Lev et al. | 717/159 |
| 8,266,609 B2 * | 9/2012 | Harris | 717/159 |

(Continued)

OTHER PUBLICATIONS

Ennals, Robert, "Efficient Software Transactional Memory," 2003, Intel Corp.*

(Continued)

*Primary Examiner* — Qing Chen
(74) *Attorney, Agent, or Firm* — Kevin Sullivan; Raghu Chinagudabha; Micky Minhas

(57) ABSTRACT

A dynamic race detection system is provided that detects race conditions in code that executes concurrently in a computer system. The dynamic race detection system uses a modified software transactional memory (STM) system to detect race conditions. A compiler converts portions of the code that are not configured to operate with the STM system into pseudo STM code that operates with the STM system. The dynamic race detection system detects race conditions in response to either a pseudo STM transaction in the pseudo STM code failing to validate when executed or an actual STM transaction failing to validate when executed because of conflict with a concurrent pseudo STM transaction.

12 Claims, 4 Drawing Sheets

(56) References Cited

U.S. PATENT DOCUMENTS

| | | | |
|---|---|---|---|
| 8,296,749 B2* | 10/2012 | Zhao et al. | 717/158 |
| 8,601,456 B2* | 12/2013 | Duffy et al. | 717/154 |
| 2002/0120428 A1 | 8/2002 | Christiaens | |
| 2005/0177775 A1 | 8/2005 | Qadeer et al. | |
| 2005/0216798 A1 | 9/2005 | Yu | |
| 2007/0028056 A1* | 2/2007 | Harris | 711/150 |
| 2007/0101314 A1* | 5/2007 | Singh | 717/120 |
| 2007/0130238 A1* | 6/2007 | Harris et al. | 707/206 |
| 2007/0136290 A1* | 6/2007 | Shinnar et al. | 707/8 |
| 2007/0136365 A1* | 6/2007 | Tarditi et al. | 707/103 R |
| 2007/0143276 A1* | 6/2007 | Harris | 707/4 |
| 2007/0143287 A1* | 6/2007 | Adl-tabatabai et al. | 707/8 |
| 2007/0143360 A1* | 6/2007 | Harris et al. | 707/202 |
| 2007/0143741 A1* | 6/2007 | Harris | 717/121 |
| 2007/0150509 A1* | 6/2007 | Lev et al. | 707/103 R |
| 2007/0156780 A1* | 7/2007 | Saha et al. | 707/202 |
| 2007/0169030 A1* | 7/2007 | Tarditi et al. | 717/140 |
| 2007/0169031 A1* | 7/2007 | Harris | 717/140 |
| 2008/0010532 A1* | 1/2008 | Lev et al. | 714/35 |
| 2008/0034359 A1* | 2/2008 | Duffy et al. | 717/152 |
| 2008/0127150 A1* | 5/2008 | Duffy et al. | 717/159 |
| 2008/0147757 A1* | 6/2008 | Duffy et al. | 707/205 |
| 2008/0256073 A1* | 10/2008 | Detlefs et al. | 707/8 |
| 2009/0172306 A1* | 7/2009 | Nussbaum et al. | 711/154 |
| 2009/0172654 A1* | 7/2009 | Zhao et al. | 717/158 |

OTHER PUBLICATIONS

Saha et al., "McRT-STM: A High Performance Software Transactional Memory System for a Multi-Core Runtime," 2006, ACM, p. 187-197.*

Herlihy et al., "Dreadlocks: Efficient Deadlock Detection for STM," Feb. 2008, TRANSACT 2008, p. 1-8.*

Tasiran, Serdar, "A Compositional Method for Verifying Software Transactional Memory Implementations," Apr. 2008, Microsoft Corp.*

Choi, et al., "Efficient and Precise Datarace Detection for Multithreaded Object-Oriented Programs", 2002, p. 258-269.

Flangon, et al., "Atomizer: A Dynamic Atomicity Checker for Multithreaded Programs", 2004, p. 256-267.

Shpeisman, et al., "Enforcing Isolation and Ordering in STM", Jun. 2007, p. 78-88.

Savage, et al., "Eraser: A Dynamic Data Race Detector for Multithreaded Programs", ACM Transactions on Computer Systems, vol. 15, No. 4, Nov. 1997, pp. 391-411.

O'Callahan, et al., "Hybrid Dynamic Data Race Detection", PPoPP'03, Jun. 11-13, 2003, San Diego, California, USA, pp. 167-178.

Yu, et al., "RaceTrack: Efficient Detection of Data Race Conditions via", SOSP'05, Oct. 23-26, 2005, Brighton, United Kingdom, 14 Pages.

* cited by examiner

DETECTING RACE CONDITIONS WITH A SOFTWARE TRANSACTIONAL MEMORY SYSTEM

BACKGROUND

Computer programs may be written to allow different portions (e.g., threads) of the program to be executed concurrently. One of the difficulties in writing correct multi-threaded programs is the possibility of race conditions. Race conditions are concurrent accesses to the same memory location by more then one thread where at least one of the accesses is a write. Race conditions are caused when programs fail to properly synchronize accesses using some locking discipline and may lead to highly non-deterministic behavior. The behavior is usually a bug and may be a bug that is particularly difficult to diagnose using traditional debugging techniques.

Static race detection techniques typically involving having the programmer add annotations to the program that express the locking discipline. Adherence to the locking discipline is then statically checked. The extra annotations, however, may be extensive and place additional work in the programmer to learn a new, or at least significantly extended, language. In addition, the annotations may not support all desired synchronization idioms. Dynamic race detection techniques may not be sound or complete. Dynamic race detection techniques may both give false positives and fail to detect all races.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A dynamic race detection system is provided that detects race conditions in code that executes concurrently in a computer system. The dynamic race detection system uses a modified software transactional memory (STM) system to detect race conditions. A compiler converts portions of the code that are not configured to operate with the STM system into pseudo STM code that operates with the STM system. The dynamic race detection system detects race conditions in response to either a pseudo STM transaction in the pseudo STM code failing to validate when executed or an actual STM transaction failing to validate when executed because of conflict with a concurrent pseudo STM transaction.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
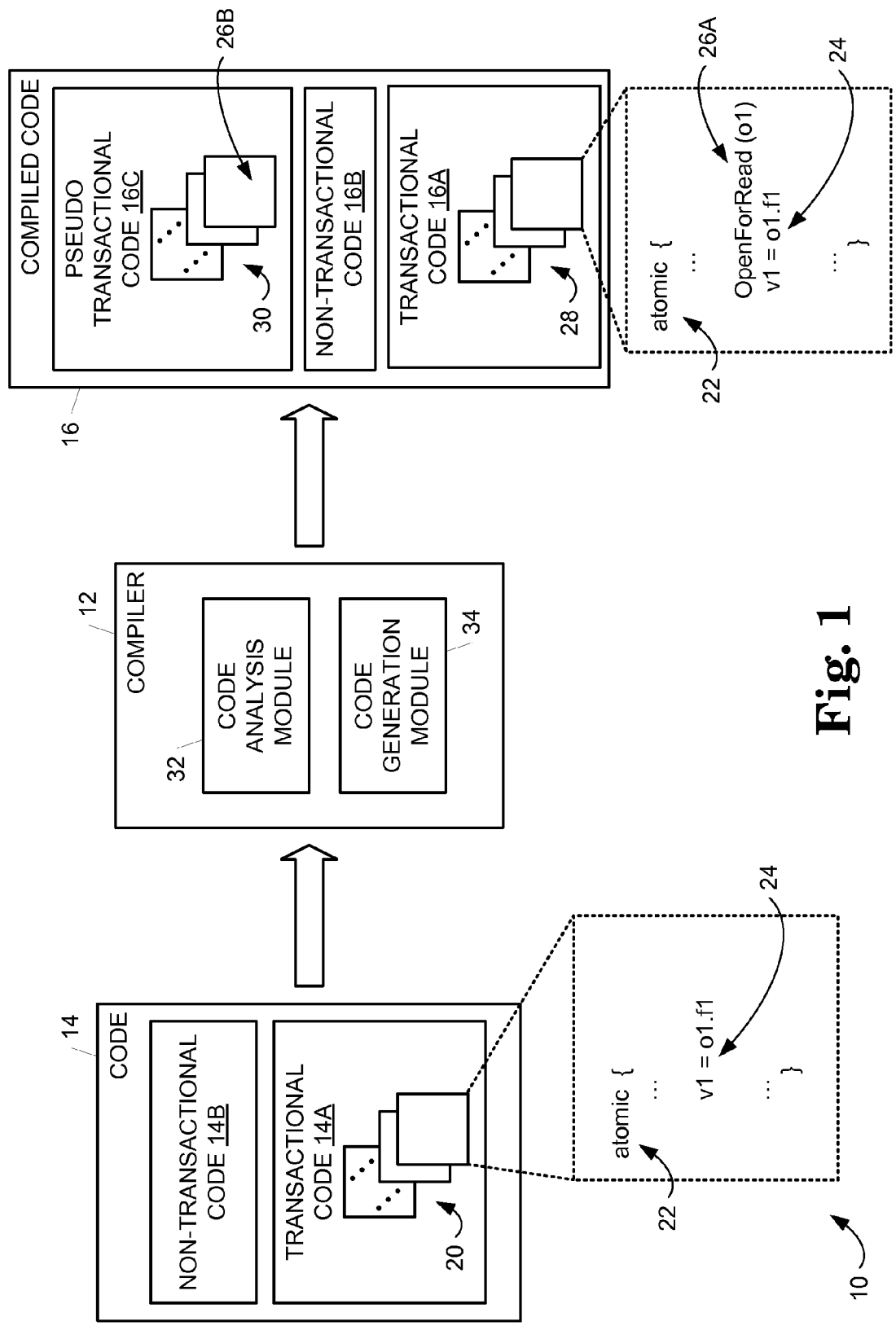
FIG. 1 is a block diagram illustrating an embodiment of a compiler system with a compiler that is configured to generate compiled code with pseudo software transactional memory transactions.

FIG. 1 is a block diagram illustrating an embodiment of a compiler system with a compiler that is configured to generate compiled code with pseudo software transactional memory transactions.

FIG. 1 is a block diagram illustrating an embodiment of a compiler system 10 with a compiler 12 that is configured to generate compiled code 16 with pseudo software transactional memory transactions 30 from code 14.

Compiler system 10 represents a compile mode of operation in a computer system, such as computer system 100 shown in FIG. 5 and described in additional detail below, where the computer system is executing instructions to compile code 14 into compiled code 16. In one embodiment, compiler system 10 includes a just-in-time (JIT) compiler system that operates in computer system 10 in conjunction with a runtime environment (not shown) executed by an operating system (OS), such as OS 122 shown in FIG. 5 and described in additional detail below, an STM library, such as STM library 42 shown in FIGS. 3 and 5 and described in additional detail below, and any additional runtime libraries (not shown). In another embodiment, compiler system 10 includes a stand-alone compiler system that produces compiled code 16 for execution on the same or a different computer system.

In one embodiment, code 14 includes transactional code 14A with a set of one or more STM transactions 20 and non-transactional code 14B. Transaction code 14A includes STM code with a set of one or more STM transactions 20. Each STM transaction 20 includes a transaction designator 22 that indicates to compiler 12 that a corresponding portion of code 14 is an STM transaction 20. Each STM transaction 20 may include zero or more memory accesses 24 that read from and/or write to a memory location. Each transaction 20 includes a sequence of instructions that is designed to execute atomically, i.e., as if the sequence is executing in isolation from other code in code 14. Accordingly, each transaction 20 forms an atomic block of code 14. Non-transactional code 14B includes the remainder of code 14 that does not include any STM code (i.e., any STM transactions for a S™ system). In other embodiments, code 14 may include only non-transactional code 14B and transactional code 14A may be omitted.

Code 14 may be any suitable source code written in a language such as Java or C# or any suitable bytecode such as Common Intermediate Language (CIL), Microsoft Intermediate Language (MSIL), or Java bytecode.

Compiler 12 accesses or otherwise receives code 14 and transforms code 14 into compiled code 16 for execution by a computer system. A code generation module 34 of compiler 12 performs any desired conversion of the set of instructions of code 14 into a set of instructions that are executable by a designated computer system and includes the set of instructions in compiled code 16. Code generation module 34 modifies STM transactions 20 of transactional code 14A to include calls to STM primitives 26A in transactional code 16A that operate with STM system 40.

As will be described in additional detail below, a code analysis module 32 of compiler 12 analyzes non-transactional code 14B to convert portions of non-transactional code 14B to pseudo transactional code 16C. Code analysis module 32 causes code generation module 34 generate pseudo transactional code 16C to include pseudo STM primitives 26B in pseudo STM transactions 30 where the pseudo STM primitives 26B operate with STM system 40 to detect race conditions as described in additional detail below with reference to FIGS. 3, 4A, and 4B. For any portions of non-transactional code 14B that are not included in pseudo STM transactions 30 (e.g., synchronization operations as described below), code analysis module 32 causes code generation module 34 generate non-transactional code 16B to correspond to these portions of non-transactional code 14B.

For transactional code 14A, code generation module 34 identifies transactions 20 from transaction designators 22 and modifies transactions 20 into transactions 28 in compiled code 16 that include invocations of STM primitives 26A. STM primitives 26A are designed to operate in conjunction with an STM system, such as an STM system 40 shown in FIG. 3 and described in additional detail below. Each STM primitive 26A invokes a function in an STM library, such as STM library 42 shown in FIG. 3. STM primitives 26A include STM primitives that manage the execution of each transaction 28 (e.g., STM primitives that start, abort, commit, and retry transactions 28). STM primitives 26A also include STM primitives that manage the memory accesses of each transaction 28 (e.g., STM primitives that open memory locations of transactions 28 for reading and/or writing). Compiler 12 generates transactions 28 in compiled code 16 to include appropriate invocations of STM primitives 26A.

Figure 2:
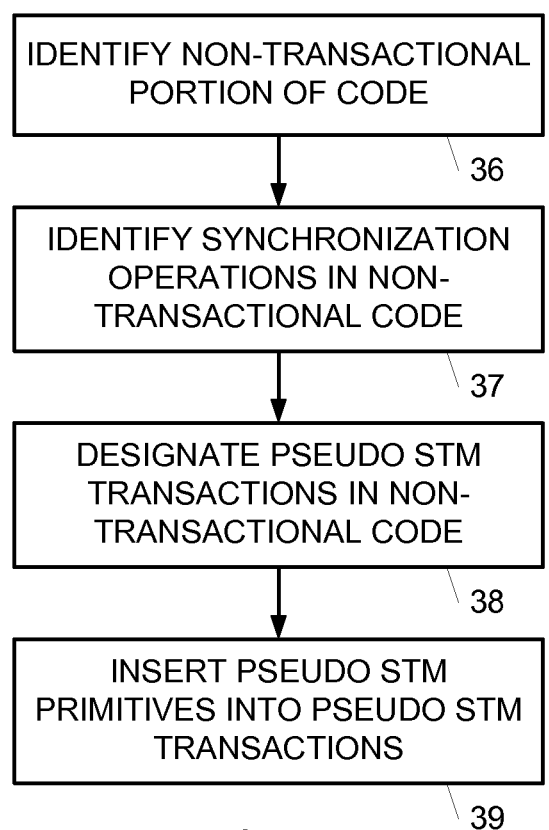
FIG. 2 is a flow chart illustrating an embodiment of a method for generating compiled code with pseudo software transactional memory transactions.

For non-transactional code 14B, compiler 12 performs the method of FIG. 2 to convert portions of non-transactional code 14B into pseudo transactional code 16C that operates with STM system 40. FIG. 2 is a flow chart illustrating an embodiment of a method for generating compiled code 16 with pseudo STM transactions 30.

In FIG. 2, code analysis module 32 identifies non-transactional code 14B in code 14 as indicated in a block 36. To do so, code analysis module 32 may identify STM transactions 20 in code 14 and identify all code 14 except STM transactions 20 as non-transactional code 14B.

Code analysis module 32 identifies synchronization operations in non-transactional code 14B as indicated in a block 37. Synchronization operations are operations that represent potential synchronization points between threads that execute different portions of non-transactional code 14B. Synchronization operations may include operations that acquire a lock, release a lock, read or write to a volatile memory location, perform an atomic hardware operation (e.g., an operation of the Interlocked class), or, as designated in transactional code 14A, execute an STM transaction 20.

Code analysis module 32 designates pseudo STM transactions 30 in non-transactional code 14B as indicated in a block 38. Code analysis module 32 divides non-transactional code 14B into pseudo STM transactions 30 and synchronization operations. Code analysis module 32 ensures that the identified synchronization operations are not included in pseudo STM transactions 30. Code analysis module 32 configures a pseudo STM transaction 30 prior to the synchronization operations so that the pseudo STM transaction 30 commits (i.e., completes) before the synchronization operation starts. Code analysis module 32 may also configure a pseudo STM transaction 30 to start after the synchronization operation transaction 20 commits. By doing so, code analysis module 32 causes synchronization operations to be executed outside of pseudo STM transactions 30. By their nature, synchronization operations generally do not represent a racing access.

In particular, where a synchronization operation is a top level STM transaction 20, code analysis module 32 configures a pseudo STM transaction 30 prior to the top level STM transaction 20 so that the pseudo STM transaction 30 commits (i.e., completes) before the top level STM transaction 20 starts. Code analysis module 32 may also configure a pseudo STM transaction 30 to start after the top level STM transaction 20 commits.

Code analysis module 32 handles synchronization operations as just described because the synchronization operations define what regions of code 14 represent a race. If a thread takes a lock, then the code within that locked region should be atomic with respect to any other concurrent code that accesses the variables protected by the lock. By making the code within the locked region a separate pseudo STM transaction 30, STM system 40 may detect whether this property holds.

Aside from excluding synchronization operations from pseudo STM transactions 30, code analysis module 32 may choose to terminate each pseudo STM transaction 30 and start a new pseudo STM transaction 30 at any point heuristically. Long pseudo STM transactions 30 may require a large amount of log resources and cause long pauses for validation and write-lock release (described below). However, longer pseudo STM transactions 30 may increase the probability of detecting race conditions. In one embodiment, code analysis module 32 selects lengths of pseudo STM transactions 30 to attempt ensure that a maximum size of logs 52W and 52R (shown in FIG. 3) for each pseudo STM transaction 30 are not exceeded. In other embodiments, code analysis module 32 expresses other length criteria for pseudo STM transactions 30 that direct STM system 40 to cause a pseudo STM transaction 30 to commit and another pseudo STM transaction 30 to start.

Because pseudo STM transaction 30 are not re-executed as described below, pseudo STM transaction 30 are not bound by the constraint of lexical nesting that compiler 12 may require for S™ transactions 28. Pseudo STM transaction 30 may commit and restart dynamically at any point. In addition, compiler 12 ensures that pseudo STM transaction 30 are not nested.

Code generation module 34 inserts pseudo STM primitives 26B into pseudo STM transactions 30 as indicated in a block 39. Pseudo STM primitives 26B invoke functions in STM system 40 that allow race conditions to be detected as will now be described.

Figure 3:
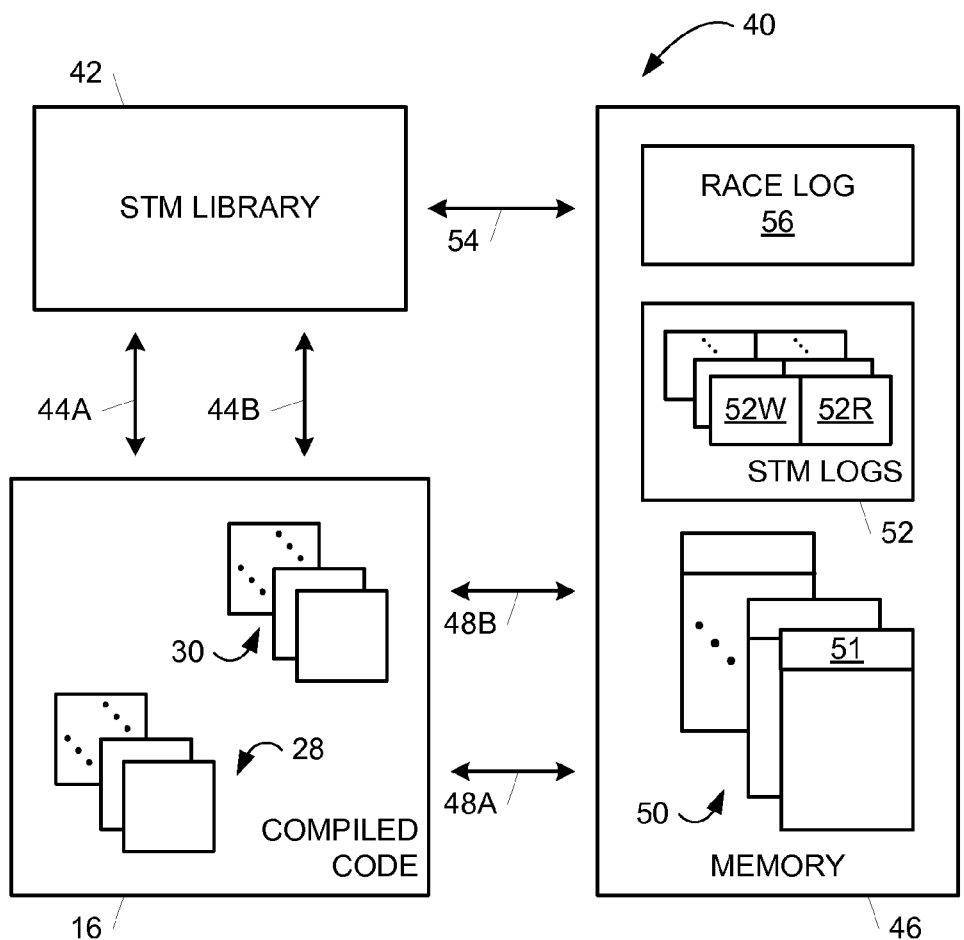
FIG. 3 is a block diagram illustrating an embodiment of a software transactional memory system that executes code with pseudo software transactional memory transactions.

FIG. 3 is a block diagram illustrating an embodiment of an STM system 40 that executes code 16 with pseudo STM transactions 30. STM system 40 includes code 16 with STM transactions 28 and pseudo STM transactions 30, an STM library 42, and a memory system 46.

STM system 40 is configured to manage both the execution of STM transactions 28 and pseudo STM transactions 30 in code 16 by threads in the computer system. STM system 40 manages the execution of pseudo STM transactions 30 to detect race conditions and thereby forms a dynamic race detection system as described in additional detail below.

STM system 40 is configured to manage the execution of STM transactions 28 in code 16 to allow STM transactions 28 to be executed atomically and, if desired, rollback or undo changes made by STM transactions 28. As described above, STM transactions 28 include STM primitives 26A that call functions in STM library 42 and the functions of STM library 42 return results to STM transactions 28 as indicated by function calls and returns 44A. STM system 40 tracks memory accesses by STM transactions 28 in response to STM primitives 26A.

STM primitives 26A of each STM transaction 28 include management primitives that call start, commit, abort, and retry functions in STM library 42. An STM transaction 28 calls the start function to initiate the management of the STM transaction 28 by STM library 42. An STM transaction 28 calls the commit function to finalize the results of the transaction in memory system 46, if successful. An STM transaction 28 calls the abort function to roll back or undo the results of the transaction in memory system 46. An STM transaction 28 calls the retry function to retry the transaction.

STM primitives 26A of each STM transaction 28 also include memory access primitives that lock memory locations 50 (shown in FIG. 3) for reading and/or writing using a transactional lock 51 (shown in FIG. 3) associated with the memory locations 50. Prior to an STM transaction 28 accessing a memory location in a memory system 46 as indicated by memory accesses 48A, STM transaction 28 issues a function call to open the memory location and thereby obtains a lock to the memory location. As described below with reference to the STM memory access primitives, a memory location may be opened for reading and/or opened for writing.

In one embodiment, each STM memory access primitive operates to lock memory locations that include an object or static block in memory system 46. In other embodiments, each STM memory access primitive operates to lock other sizes or granularities of memory system 46.

In one embodiment, STM library 42 is configured to operate in two modes of operation: a direct write mode of operation and a buffered write mode of operation. In other embodiments, STM library 42 may be configured to operate in only a direct write mode of operation or only a buffered write mode of operation.

In the direct write mode of operation, STM library 42 causes memory accesses 48A by each STM transaction 28 to be made directly to memory locations 50 in memory system 46. Each write access 48A executed by STM transaction 28 writes directly to a memory location 50 indicated by the write access. Each read access 48A executed by STM transaction 28 reads directly from a memory location 50 indicated by the read access. STM library 42 adds each write and read access 48A from transaction 28 to corresponding write and read logs 52W and 52R, respectively, in STM logs 52 as indicated by an arrow 54. STM library 42 uses log 52W to roll back STM transaction 28 in response to STM transaction 28 being aborted. STM library 42 uses log 52R to validate read accesses and for retry operations.

In the buffered write mode of operation, STM library 42 causes write accesses 48A by STM transactions 28 to be made to shadow copies of memory locations 50 (not shown) in memory system 46. Each write access 48A executed by an STM transaction 28 writes directly to a shadow copy indicated by the write access. STM library 42 causes read accesses 48A that occur after a designated memory location 50 has been opened from writing by each STM transaction 28 to be made from the shadow copies. STM library 42 causes memory read accesses 48A that occur before a designated memory location 50 has been opened from writing by each STM transaction 28 to be made directly from memory locations 50. STM library 42 adds each write and read access 48A and each read access 48AB from a transaction 28 to logs 52W and 52R, respectively, as indicated by arrow 54 and uses log 52W to cause shadow copies to be stored into objects 50 in response to transaction 28 committing successfully. STM library 42 discards the shadow copies in response to transaction 28 being aborted. STM library 42 uses log 34R to validate read accesses and for retry operations.

STM system 40 is configured to manage the execution of pseudo STM transactions 30 in code 16 to detect race conditions between pseudo STM transactions 30 and between a pseudo STM transaction 30 and an STM transactions 28. STM system 40 logs any detected race conditions into a race log 56. Alternatively, STM system 40 may be configured to halt with an error when the first race condition is detected. As described above, pseudo STM transactions 30 include STM primitives 26B that call functions in STM library 42 and the functions of STM library 42 return results to pseudo STM transactions 30 as indicated by function calls and returns 44B. STM system 40 tracks memory accesses by pseudo STM transactions 30 in response to STM primitives 26B.

STM primitives 26B include modified versions of the management and memory access STM primitives 26A described above. STM primitives 26B may be used to identify pseudo STM transactions 30 as pseudo STM transactions 30 rather than actual STM transactions 28.

Like actual STM transactions 28, pseudo STM transactions 30 cause write locks to be created for memory locations 50 by STM library 42, cause a read set to be stored by STM library 42, cause optimistic reads to be validated by STM library 42, and causes version numbers of memory locations 50 to be updated by STM library 42 on commit.

Pseudo STM transactions 30 are configured to use a direct write mode of operation even in embodiments where actual STM transactions 28 use a buffered write mode of operation. This is because pseudo STM transactions 30 do not roll back or re-execute. Instead, STM library 42 logs a race condition or raises an error condition if a pseudo STM transaction 30 fails to validate optimistic read accesses (i.e., an intervening write access from another S™ transaction 28 or pseudo STM transaction 30 occurs subsequent to a read access and prior to the read access validating).

Figure 4A:
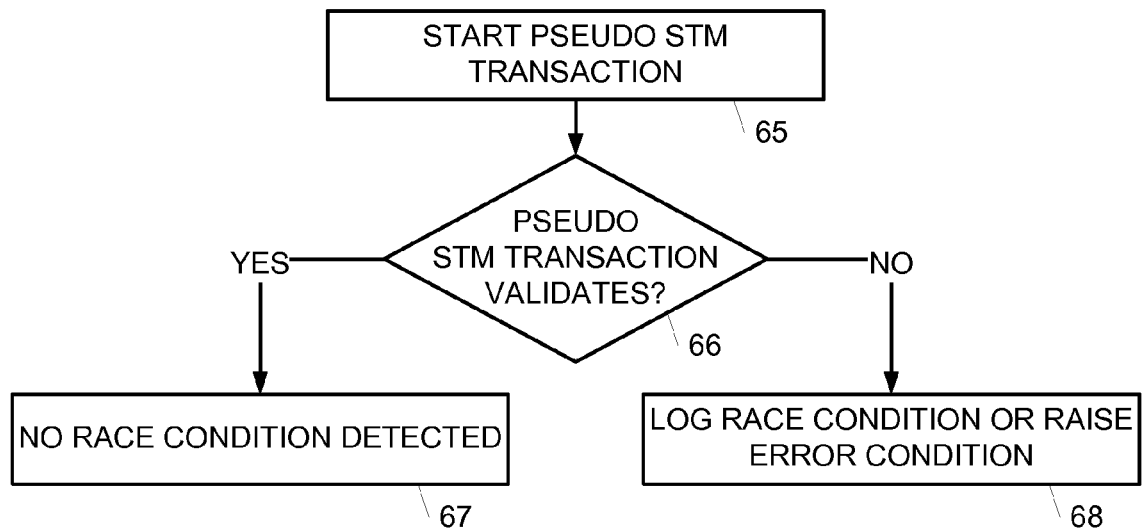
FIGS. 4A-4B are flow charts illustrating embodiment of methods for detecting race conditions in code with pseudo software transactional memory transactions.

FIG. 4A is a flow chart illustrating an embodiment of a method for detecting race conditions in code 16 with pseudo STM transactions 30. In FIG. 4A, STM library 42 starts a pseudo STM transaction 30 in response to an invocation from pseudo STM transaction 30 as indicated in a block 65. The invocation may indicate that pseudo STM transaction 30 is a pseudo STM transaction 30 rather than an actual STM transaction 28.

When pseudo STM transaction 30 attempts to commit, STM library 42 determines whether the pseudo STM transaction 30 validates as indicated in a block 66. If the pseudo STM transaction 30 validates, then STM library 42 does not detect a race condition as indicated in a block 67. If the pseudo STM transaction 30 does not validate, then STM library 42 logs a race condition into race log 56 or raises an error condition associated with the race condition as indicated in a block 68.

If the pseudo STM transaction 30 does not validate, then a write access from another S™ transaction 28 or another pseudo STM transaction 30 occurred to a memory location 50 that was read by the pseudo STM transaction 30. The other transaction 28 or 30 performing the conflicting write access is either still in progress, in which case the memory location 50 is currently locked by transaction 28 or 30, or else the other transaction 28 or 30 has completed, in which case it has updated the version number of the memory location 50. As a result, in either case the transactional lock 51 protecting the memory location 50 is in a different state than the version number of the read access of the pseudo STM transaction 30 and thus prevents the pseudo STM transaction 30 from validating. STM library 42 either logs the memory location 50 and conflicting transaction 30 and transaction 28 or 30 into race log 56 or else immediately raises an error condition.

Figure 4B:
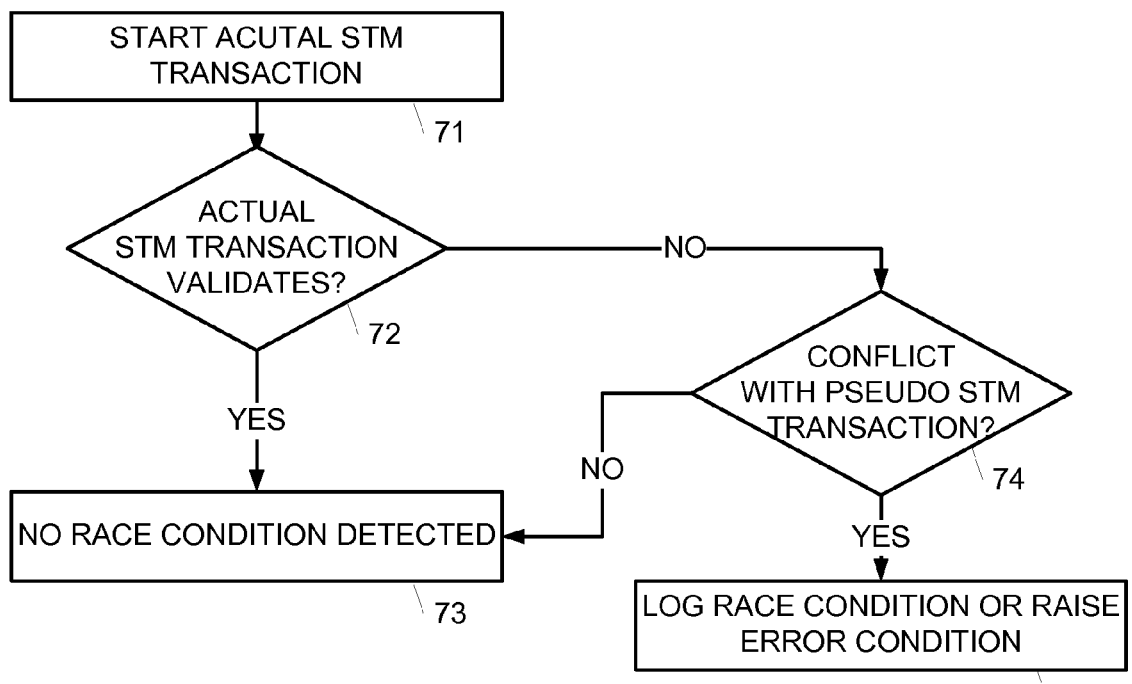

FIG. 4B is a flow chart illustrating another embodiment of a method for detecting race conditions in code 16 with pseudo STM transactions 30. In FIG. 4B, STM library 42 starts an actual STM transaction 28 in response to an invocation from the actual STM transaction 28 as indicated in a block 71.

When the actual STM transaction 28 attempts to commit, STM library 42 determines whether the actual STM transaction 28 validates as indicated in a block 72. If the pseudo STM transaction 30 validates, then STM library 42 does not detect a race condition as indicated in a block 73. If the actual STM transaction 28 does not validate, then STM library 42 determines whether a conflict with a pseudo STM transaction 30 caused the actual STM transaction 28 not to validate as indicated in a block 74. If a conflict with a pseudo STM transaction 30 caused the actual STM transaction 28 not to validate, then STM library 42 logs a race condition into race log 56 or raises an error condition associated with the race condition as indicated in a block 75. If the actual STM transaction 28 did not validate for another reason, then STM library 42 does not detect a race condition as indicated in block 73.

If the pseudo STM transaction 30 prevents another S™ transaction 28 or another pseudo STM transaction 30 from validating, then a write access from the pseudo STM transaction 30 occurred to a memory location 50 that was read by another S™ transaction 28 or another pseudo STM transaction 30. The write access by the pseudo STM transaction 30 first write-locks the transactional lock 51 associated with memory location 50, then, at commit time, updates the version number of the memory location 50. As a result, the other transaction 28 or 30 either observes memory location 50 as write-locked when it attempts to commit, or the other transaction 28 or 30 sees a version number at the time of the access that differs from the version number that the other transaction 28 or 30 observes when the other transaction 28 or 30 attempts to commit, i.e., the updated version number written by the committed pseudo STM transaction 30. Thus, this write access and prevents the other transaction 28 or 30 from validating. STM library 42 logs the memory location 50 and conflicting transaction 30 and transaction 28 or 30 into race log 56 or else immediately raises an error condition.

To increase the likelihood of race condition detection, STM library 42 implements a contention management policy to recognize pseudo STM transactions 30 as distinct from actual STM transactions 28. For example, assume that a pseudo STM transaction 30 holds a write lock on object "o", and another transaction 28 or 30 attempts to access "o". If the other transaction is pseudo STM transaction 30, then at least one of the transactions will not validate and STM library 42 detects the race condition. If the other transaction is an actual STM transaction 28, the actual STM transaction 28 may roll back and re-execute or just wait. STM library 42 avoids that outcome by detecting that pseudo STM transaction 30 is not an actual STM transaction 28 and reporting the race condition.

In the above embodiments, the race condition detected by STM library 42 may not actually occur. Instead, a conflict with a pseudo STM transaction 30 indicates that the region of code in the pseudo STM transaction 30 might, in some execution, produce a race condition with another region of code in STM transaction 28 or another region of code in pseudo STM transaction 30.

STM system 40 may also be used to detect adherence to some forms of static lock discipline in code 14. If in some program, there was a convention that in class C, fields f1 and f2 may be accessed transactionally by multiple threads, but field f3 would only be accessed by some distinguished thread T1, then STM system 40 would break such a program. STM system 40 would take a shadow copy of an instance c of C and apply transactional updates to the shadow copy. T1 might now update c.f3. When the transaction writes back the shadow copy, if that also overwrites c.f3, then the update by T1 has been lost for inexplicable reasons. Such a scenario may be referred to as a granular lost update (GLU) problem.

To allow the above scenario, STM system 40 allows programmers to add annotations that indicate that field f3 is available to thread T1 as shown by the [NonTxField] annotation in Example 1.

Example 1

```
class Foo {
    int f1;
    int f2;
    [NonTxField]
    int f3;
}
```

STM system 40 detects an access to a field that has not been annotated as thread-private via [NonTxField] as racing with any concurrent accesses to the shared field. As a result, STM system 40 may prompt the programmer to add the proper annotation.

Referring back to FIG. 3, memory system 46 includes any suitable type, number, and configuration of volatile or non-volatile storage devices configured to store instructions and data. The storage devices of memory system 46 represent computer readable storage media that store computer-executable instructions including code 16 and STM library 42. The instructions are executable by the computer system to perform the functions and methods of code 16 and STM library 42 herein. Examples of storage devices in memory system 46 include hard disk drives, random access memory (RAM), read only memory (ROM), flash memory drives and cards, and magnetic and optical disks.

The above embodiments may advantageously provide convenient and efficient dynamic checking tool for both race conditions and granular lost update (GLU) problems. The above embodiments exploit the similarity of conflict detection between concurrent transactions and race detection between concurrent blocks of non-transactional code. Although the checking is dynamic, the checking may detect race conditions not manifest in the outcomes of reads and writes.

Figure 5:
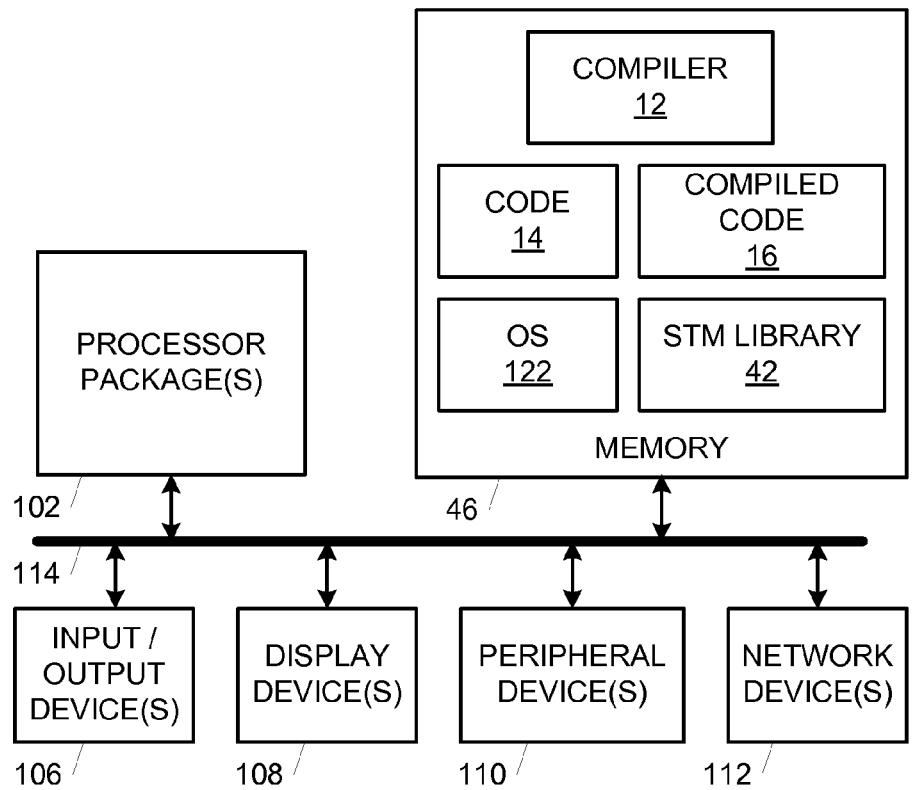
FIG. 5 is a block diagram illustrating an embodiment of a computer system configured to execute an STM compiler and/or S™ library.

FIG. 5 is a block diagram illustrating an embodiment of a computer system 100 configured to execute an STM compiler 12 and/or S™ library 42.

Computer system 100 includes one or more processor packages 102, memory system 46 (also shown in FIG. 3), zero or more input/output devices 106, zero or more display devices 108, zero or more peripheral devices 110, and zero or more network devices 112. Processor packages 102, memory system 46, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 46, input/output devices 106, display devices 108, peripheral devices 110, network devices 112, and interconnections 114) may be contained in a common housing (not shown) or in any suitable number of separate housings (not shown).

Processor packages 102 each include one or more execution cores. Each execution core is configured to access and execute instructions stored in memory system 46. The instructions may include a basic input output system (BIOS) or firmware (not shown), OS 122, STM library 42, code 12, compiler 14, and compiled code 16. Each execution core may execute the instructions in conjunction with or in response to information received from input/output devices 106, display devices 108, peripheral devices 110, and/or network devices 112.

Computer system 100 boots and executes OS 122. OS 122 includes instructions executable by execution cores to manage the components of computer system 100 and provide a set of functions that allow programs to access and use the components. In one embodiment, OS 122 is the Windows operating system. In other embodiments, OS 122 is another operating system suitable for use with computer system 100.

As noted above, memory system 46 includes any suitable type, number, and configuration of volatile or non-volatile storage devices configured to store instructions and data. The storage devices of memory system 46 represent computer readable storage media that store computer-executable instructions including code 12, compiler 14, compiled code 16, OS 122, and STM library 42.

Memory system 46 stores instructions and data received from processor packages 102, input/output devices 106, display devices 108, peripheral devices 110, and network devices 112. Memory system 46 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of compiling code, the method comprising:
 identifying a first portion of the code that does not include a software transactional memory (STM) designator;
 converting the first portion of the code into a first pseudo STM transaction including a sequence of instructions configured to execute atomically with an STM system;
 ensuring that the first portion of the code does not include a synchronization operation; and
 configuring the first pseudo STM transaction prior to a synchronization operation so that the first pseudo STM transaction commits before the synchronization operation starts.

2. The method of claim 1 wherein the first pseudo STM transaction is configured to execute with the STM system without re-executing.

3. The method of claim 1 further comprising:
 converting a second portion of the code that includes the STM designator into an actual STM transaction.

4. The method of claim 3 wherein the actual STM transaction is configured to re-execute in response to aborting in the STM system.

5. The method of claim 1 further comprising:
 inserting a pseudo STM invocation into the first pseudo STM transaction.

6. The method of claim 1 further comprising:
 identifying a second portion of the code that does not include the STM designator; and
 converting the second portion of the code into a second pseudo STM transaction including a sequence of instructions configured to execute atomically with the STM system.

7. A method of compiling code, the method comprising:
 identifying a non-transaction portion of the code that does not include a software transactional memory (STM) designator;

dividing the non-transaction portion of the code into a plurality of pseudo STM transactions that each includes a sequence of instructions configured to execute atomically with an STM system;

ensuring that each of the plurality of pseudo STM transactions does not include a synchronization operation; and configuring the plurality of pseudo STM transactions prior to synchronization operations so that the plurality of pseudo STM transactions commit before the synchronization operations start.

8. The method of claim 7 wherein each of the plurality of pseudo STM transactions is configured to execute with the STM system without re-executing.

9. The method of claim 7 further comprising:

inserting at least one pseudo STM primitive into each of the plurality of pseudo STM transactions.

10. The method of claim 7 further comprising:

identifying a transaction portion of the code that includes the STM designator; and compiling the transaction portion of the code including a plurality of actual STM transactions that are executable by the STM system.

11. The method of claim 10 wherein each of the plurality of actual STM transactions is configured to re-execute in response to aborting in the STM system.

12. The method of claim 11 further comprising:

inserting at least one actual STM primitive into each of the plurality of actual STM transactions.

* * * * *